United States Patent [19]

Traylor

[11] Patent Number: 4,646,775
[45] Date of Patent: Mar. 3, 1987

[54] VACUUM BREAKER

[76] Inventor: Paul L. Traylor, 16591 Milliken Ave., Irvine, Calif. 92714

[21] Appl. No.: 783,695

[22] Filed: Oct. 3, 1985

Related U.S. Application Data

[63] Continuation of Ser. No. 548,341, Nov. 3, 1983, abandoned.

[51] Int. Cl.$^4$ ............................................. F16K 24/00
[52] U.S. Cl. ..................... 137/218; 137/216; 137/217; 137/269; 137/270; 137/860
[58] Field of Search ............... 137/215, 216, 217, 218, 137/860, 270, 269; 251/343; 285/354, 387, 388

[56] References Cited

U.S. PATENT DOCUMENTS

| | | | |
|---|---|---|---|
| 159,142 | 1/1875 | Baird | 137/893 |
| 1,086,641 | 2/1914 | Blume | 285/354 X |
| 2,217,132 | 10/1940 | O'Brien | 137/217 |
| 2,287,534 | 6/1942 | Powers | 137/216 |
| 2,347,988 | 5/1944 | Burke | 137/217 |
| 2,370,247 | 2/1945 | Kenney | 137/218 |
| 2,738,798 | 3/1956 | Goodrie | 137/216 |
| 2,850,299 | 9/1958 | Risley | 285/354 X |
| 2,878,826 | 3/1959 | Dolenga | 137/216 |
| 3,011,512 | 12/1961 | Moen | 137/218 |
| 3,307,571 | 3/1967 | Smith | 137/218 |
| 3,417,775 | 12/1968 | Smith | 137/218 |
| 4,049,018 | 9/1977 | Skibowski | 137/561 R |
| 4,475,570 | 10/1984 | Pike et al. | 137/218 |

FOREIGN PATENT DOCUMENTS

| | | | |
|---|---|---|---|
| 2603566 | 8/1976 | Fed. Rep. of Germany | 285/388 |
| 1165271 | 10/1958 | France | 137/860 |

Primary Examiner—Gerald A. Michalsky
Attorney, Agent, or Firm—Fulwider, Patton, Rieber, Lee & Utecht

[57] ABSTRACT

A vacuum breaker for connection in the discharge line from a source of liquid. The preferred embodiment comprises an elongated body for connection in the discharge line and opening to atmosphere through a lateral passageway selectively closed by a cylindrical sleeve coaxially carried by said body. In the open position of the sleeve the vacuum breaker is particularly adapted for in-line installation in the drain line of appliances. Various applications for the vacuum breaker are disclosed.

13 Claims, 18 Drawing Figures

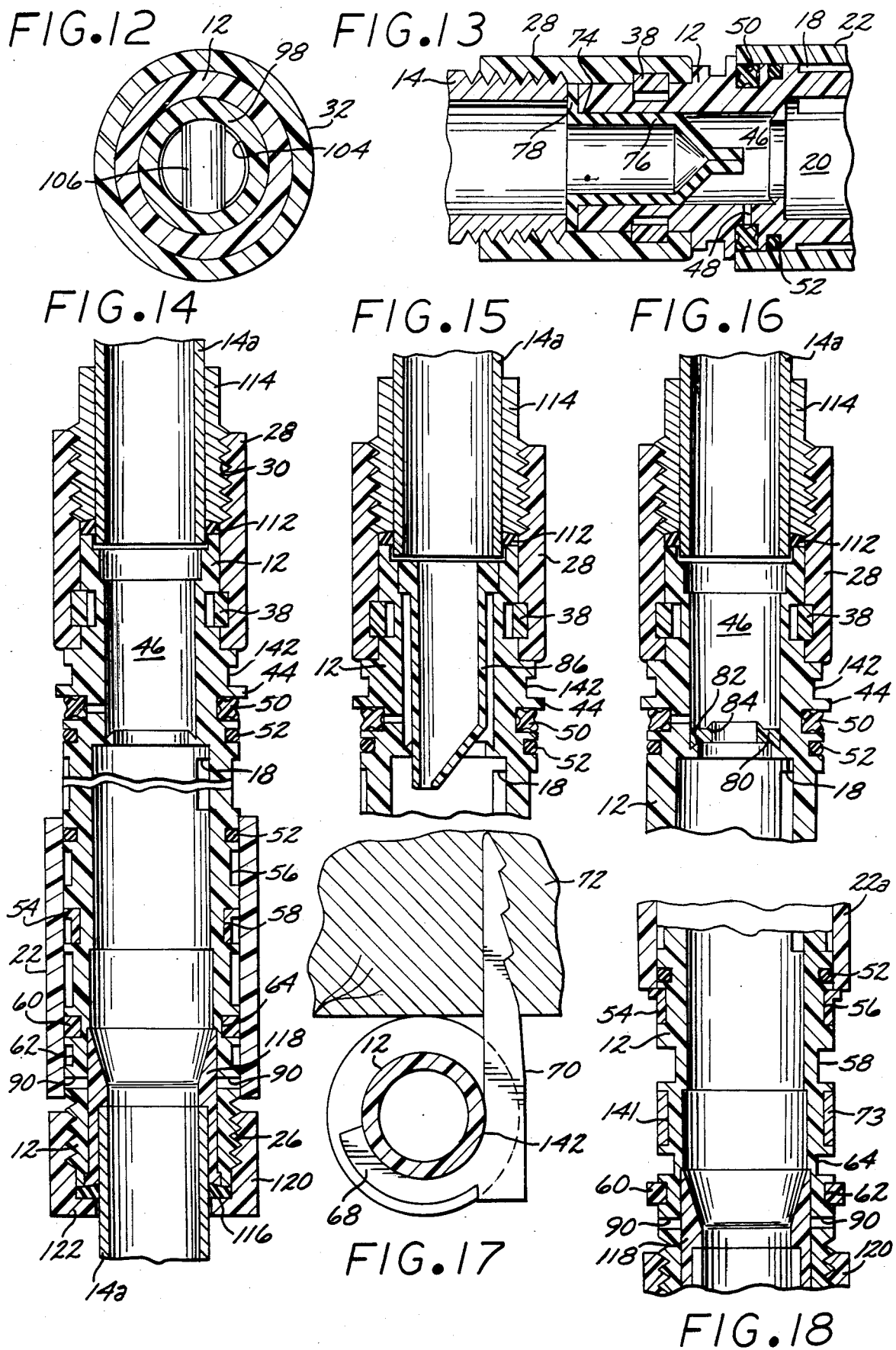

VACUUM BREAKER

CROSS REFERENCE TO RELATED APPLICATION

This is a continuation of applicant's copending application Ser. No. 06/548,341, filed Nov. 3, 1983, entitled "Vacuum Breaker", now abandoned.

BACKGROUND OF THE INVENTION

1. Field of the Invention

The invention relates to a vacuum breaker for connection in the discharge line from a source of liquid.

2. Description of the Prior Art

Various devices exist in the prior art for preventing back syphoning of discharged, unwanted or polluted liquids back toward the source of the liquid. For example, U.S. Pat. No. 3,411,524, "Vacuum Breaker", issued Nov. 19, 1968, discloses one form of vacuum breaker adapted to be attached to the end of the discharge conduit from a water conditioner or washing machine. The referenced vacuum breaker is specially configured to be attached to a conventional standpipe for carrying away the discharged liquid. The vacuum breaker is typical of some prior art vacuum breakers in that it is specially adapted for mounting directly onto the existing standpipe to transmit the discharge into the standpipe. However, there are many situations in which it is not convenient or practicable to mount the vacuum breaker either directly or in close proximity to a sump opening, sewer line, or drain. Whenever required, it would be preferable to locate an "in-line" vacuum breaker between the inlet and discharge ends of the discharge line, and preferably in a position where it can be conveniently attached to a wall in an inconspicuous and space saving fashion.

Most vacuum breakers of the prior art are designed for a single function, such as in the drain lines from water conditioners, washing machines, automatic ice machines and similar appliances. It would be desirable for such a vacuum breaker to also be capable of carrying liquid under pressure, and accept a backflow preventer. It could then be used, for example, in a garden hose attached to lawn sprinklers or in a hose attached to the engine block of a vehicle during a backflushing operation of the cooling system, or to any device or system which could produce a potentially undesirable backflow of liquid. No such universal device exists in the prior art.

SUMMARY OF THE INVENTION

According to the present invention, a vacuum breaker is provided for connection in the discharge line from a source of liquid. The vacuum breaker comprises an elongated cylindrical body having various end fitting arrangements whereby it can be readily connected by threaded attachment, by compression fittings for tubing, or by adhesive connection for plastic pipe.

The vacuum breaker includes a lateral passageway opening to atmosphere via one or more openings and selectively covered by a cylindrical sleeve movable between a closed position overlying the passageway and an open position whereby a varying amount of the lateral passageway is open to atmosphere. The sleeve is preferably longitudinally slidable between the two extreme or end positions, but with possible stops at other intermediate positions. The slidable sleeve is also rotatable and can be provided with one or more openings movable into and out of alignment with the body passageway upon rotation of the sleeve.

The elongated body may be provided with pressure relief openings closed by an overlying seal adapted to unseat the openings upon attainment of a predetermined pressure within the interior of the body.

The body includes provision for mounting annular circumferentially split locking clips selectively locatable to permit or prevent movement of the sleeve.

The body is adapted to receive one or more types of backflow preventers to prevent backflow or upstream flow of liquid whereby in one embodiment the vacuum breaker can be used as a backflow preventer with the sleeve in its closed position. In this configuration, liquid under pressure is permitted to flow in the preferred or downstream direction.

Preferred embodiments include flow control devices or shaped orifices in the body to increase the velocity of the liquid or to change its direction or shape as it flows past the lateral passageway and, out of the body.

The vacuum breaker is configured for easy attachment to conventional pipe, and to blend with such pipe and associated fittings. It can be conveniently mounted to a wall by a thin wall conduit clamp or a nail clamp driven into a wall stud or the like.

Other objects and features of the invention will become apparent from consideration of the following description taken in connection with the accompanying drawings.

BRIEF DESCRIPTION OF THE DRAWINGS

FIG. 12 is a view taken along the line 12—12 of FIG. 11;

FIG. 13 is a longitudinal cross-sectional view of the upstream chamber of the vacuum breaker body, particularly illustrating an embodiment employing an upstream backflow preventer;

FIG. 14 is an enlarged view taken along the line 14—14 of FIG. 3;

FIG. 15 is a longitudinal cross-sectional view of the upstream chamber of the vacuum breaker body, particularly illustrating one form of flow control or flow shaping device;

FIG. 16 is a longitudinal cross-sectional view of the upstream chamber of the vacuum breaker body, particularly illustrating another form of flow control or flow restrictor device;

FIG. 17 is an enlarged view taken along the line 17—17 of FIG. 3; and

FIG. 18 is an enlarged view taken along the line 18—18 of FIG. 4.

DESCRIPTION OF THE PREFERRED EMBODIMENTS

Figure 1:
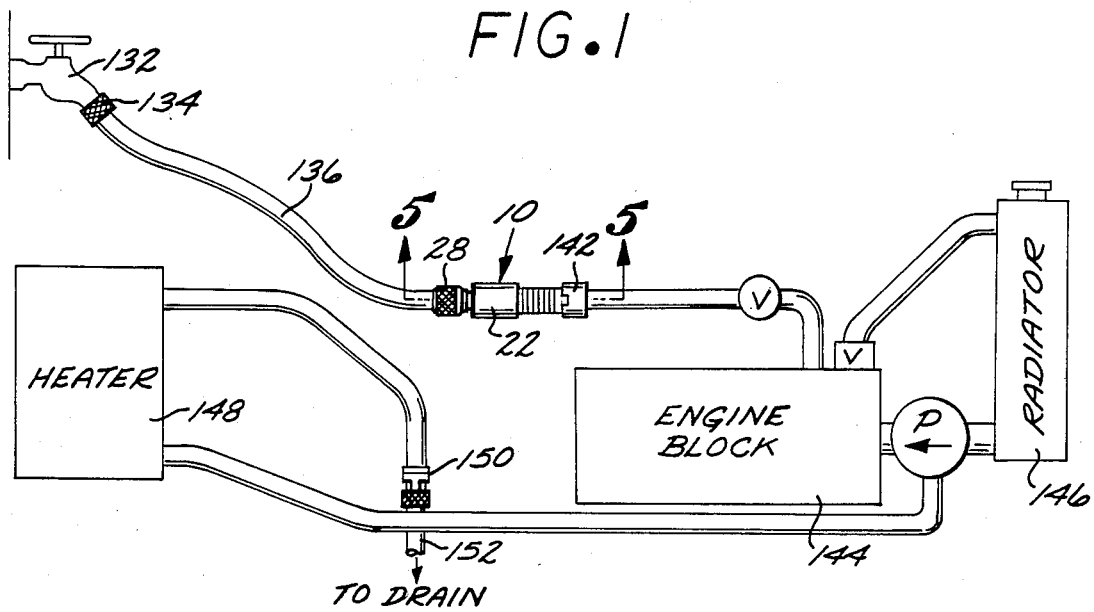
FIG. 1 is a schematic view of the present vacuum breaker installed in a garden hose utilized in a system for backflushing a vehicle engine cooling system.

Referring now to FIGS. 3, 4 and 5 through 10, there is illustrated one embodiment of a vacuum breaker 10 according to the present invention comprising, generally, an elongated cylindrical body 12 defining a conduit for liquid and including coupling means for connection of the inlet and outlet of the body 12 in a discharge line of a conventional water softener 16. The body 12 includes one or more longitudinally extending, laterally directed passageways 18 opening to atmosphere from the elongated bore, chamber or interior 20 of the body 12.

The vacuum breaker 10 also comprises a cylindrical sleeve 22 coaxially mounted upon the body 12 and longitudinally movable between a partially closed position and a fully closed position, in each of which the sleeve 22 overlies the passageway 18 so that the body 12 can carry liquid under pressure, as will be seen, and an open position away from and opening the passageway 18 to atmosphere whereby a vacuum cannot develop in the body 12. The major components of the vacuum breaker 10 are preferably made of plastic, particularly where it may be necessary to bond it to plastic drain pipe. Also, plastic is preferred because forms of plastic are available which are light, durable, inexpensive, non-corrosive and colorable to blend with existing pipe or fittings.

Figure 3:
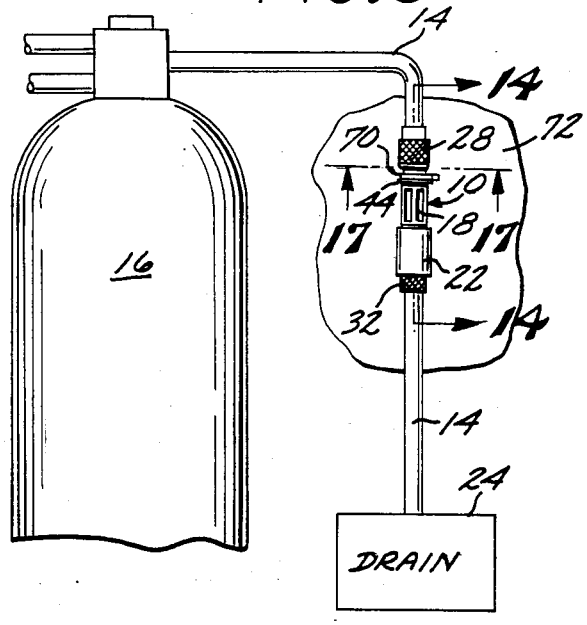
FIG. 3 is a schematic view of the present vacuum breaker installed in the discharge line of a water softener, and attached to a wall by a nail-on clamp.
Figure 4:
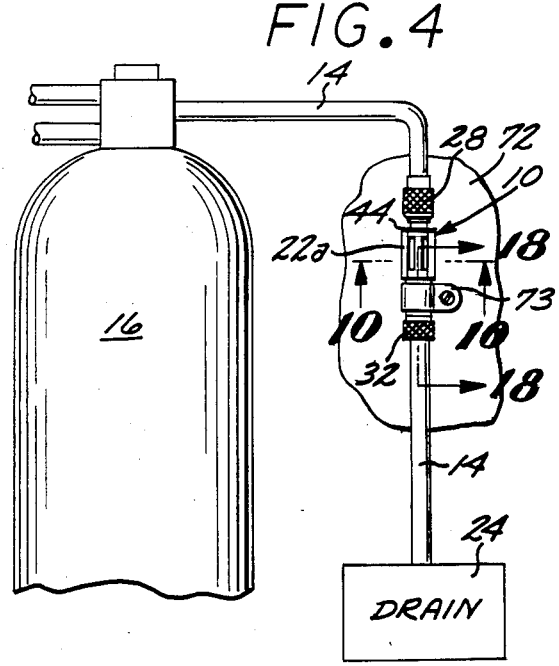
FIG. 4 is a view similar to FIG. 3, but illustrating the vacuum breaker attached to the wall by a thin wall conduit clamp.

Although a water softener 16 is illustrated in association with the vacuum breaker 10 in FIG. 3, it will be apparent that the vacuum breaker 10 can also be associated with any of various devices and appliances, such as water conditioners, water filters, washing machines, ice making machines, commercial dishwashers or the like, which accept potable water from a source either at high or low pressure and discharge it under a lower pressure or at atmospheric pressure to a suitable receptacle or drain 24. As is well known in the art, the function of a vacuum breaker is to prevent the discharged liquid or any other downstream liquid contaminant, from being siphoned in a reverse direction in the event that there is an unexpected pressure drop in the household plumbing system. When used in such an application the vacuum breaker 10 is usually disposed vertically, as seen in FIGS. 3 and 4, although it is also operable in other orientations, including various angular orientations between vertical and horizontal. The vertical orientation is better for most applications, but an angular mounting with the passageway 18 directed upwardly may be preferred for applications involving small flows.

Figure 5:
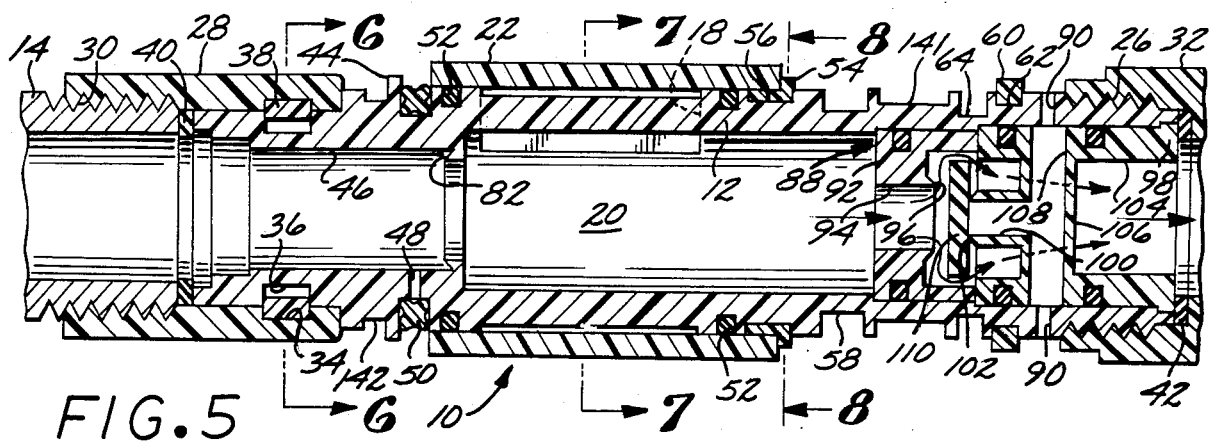
FIG. 5 is an enlarged view taken along the line 5—5 of FIG. 1.
Figure 6:
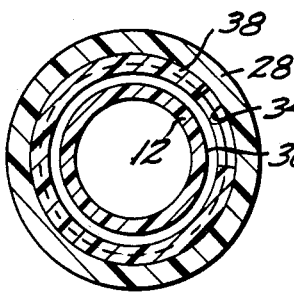
FIG. 6 is a view taken along the line 6—6 of FIG. 5.
Figure 7:
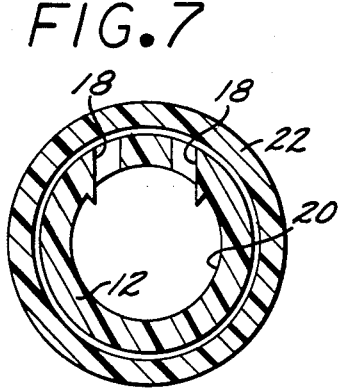
FIG. 7 is a view taken along the line 7—7 of FIG. 5.
Figure 8:
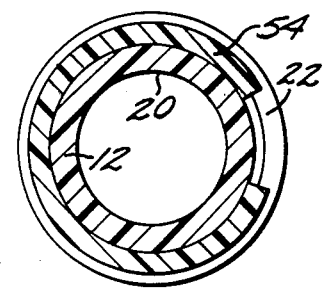
FIG. 8 is a view taken along the line 8—8 of FIG. 5.

In the embodiment of FIGS. 3, 4 and 5 the coupling means which connect the vacuum breaker 10 in the discharge line 14 are defined by male threads 26 on the downstream extremity of the body 12, and a union fitting 28 provided with female threads 30 and rotatably mounted to the upstream extremity of the body 12. The male threads 26 are adapted to threadably connect to the female threads of a usual and conventional union fitting 32 carried by the downstream portion of the discharge line 14, as seen in FIG. 3.

The union fitting 28 is threadably connected to male threads provided on the upstream portion of the discharge line 14. Although the embodiment of FIG. 5 is thus adapted for threaded connection with the adjacent extremities of a discharge line 14 having threaded fittings, it is also adapted, as will be seen, for connection to unthreaded plastic pipe or to a tubing type of discharge line.

The union fitting 28 is adapted to be mounted upon the body 12 by sliding it over the upstream extremity of the body 12. For this purpose exterior surface of the body 12 includes an annular exterior locking clip groove 36 adjacent its upstream extremity, and a confronting annular interior locking clip groove 34 is provided in the interior surface of the union fitting 28.

A resilient annular, circumferentially split locking clip 38 is compressible to fit within the exterior groove 36 to enable the union fitting 28 to longitudinally move over the upstream extremity of the body 12 to bring the interior and exterior grooves 34 and 36 into confronting relation. The resilience of the locking clip 38 normally biases the clip 38 outwardly to project into the interior groove 34 and thereby prevent relative longitudinal movement between the union fitting 28 and the body 12, while permitting rotational movement.

A compressible annular hose washer or seal 40 is disposed between the adjacent ends of the body 12 and the discharge line 14 to provide a fluid tight relation. A similar seal 42 is provided between the downstream end of the body 12 and a faying surface of the union fitting 32 to provide a fluid tight relation.

The body 12 includes an integral outwardly projecting circumferential stop or flange 44. Its engagement with the upstream extremity of the sleeve 22 defines the fully closed position of the sleeve 22. An annular groove is provided in the body 12 adjacent the flange 44. It is in fluid communication with an upstream chamber 46 of the body interior 20 through a radially or laterally opening excess pressure passage 48. A form of O-ring or sealing means 50 known in the trade as a "Quadring" is seated within the groove in overlying relation to the passage 48. Other types of resilient seals could be used for this purpose.

The sealing means 50 is movable outwardly to unseat the passage 48 upon attainment of a predetermined interior pressure. About 20 pounds per square inch is a typical upper pressure condition in an application such as that illustrated in FIG. 1.

The body 12 includes a pair of annular retainer seal grooves located to underlie the opposite extremities of the sleeve 22 in either the partially closed or fully closed positions of the sleeve 22. A pair of resilient retainer seals 52 are disposed in these grooves, respectively, and act resiliently against the sleeve 22 to resist or inhibit any movement caused by internal pressures. When the sleeve 12 is being moved between its various positions, the seals 52 are adapted to functionally hold the sleeve in any intermediate position, such as for uncovering only a portion of the passageway 18. The seals also inhibit rotational movement, and in the closed positions of the sleeve 22, provide a fluid tight seal between the sleeve 22 and the body 12.

As previously described, the flange 44 prevents movement of the sleeve 22 beyond its fully closed position. Movement from its fully closed position is normally prevented by a resilient annular, circumferentially split and flanged safety clip 54. The clip 54 rests in a relatively shallow clip groove 56 adjacent the downstream extremity of the sleeve 22 in its closed position. The safety clip 54, as seen in FIG. 5, projects out of the shallow groove 56 and provides two limit positions for sleeve 22. Downstream from the groove 56 is a similar but deeper clip groove 58 adapted to receive the clip 54 in recessed relation, that is, below the surface over which the sleeve 22 slides, as best seen in FIG. 14. The material of the clip is such that it can be spread apart and laterally mounted over the body 12 for location in either of the grooves 56 or 58. If desired, the clips could take the form of resilient seals such as O-rings expanded over the body 12 and placed into the appropriate grooves. The clip is primarily a safety feature since there is little tendency for the sleeve to move under internal pressures.

The clip 54 is reversible for mounting in the shallow clip groove 56 in either of two positions. In one position the flange of the clip 54 is located adjacent the upstream side of the groove 56 for engagement with the downstream end of the sleeve 22 to hold it in its fully closed position, as illustrated in FIGS. 13 and 18. In this fully closed position the sleeve overlies the sealing means 50 and a relatively high pressure internally of the body 12 is required to raise the sealing means off the passage 48 and against the constraint of the sleeve 22. As will be seen, location of the sleeve 22 in the fully closed position would be advantageous in an application like that illustrated in FIG. 2.

Reversal of the clip 54 to locate its flange adjacent the downstream side of the groove 56 provides for engagement of the sleeve 22 by the flange only when the sleeve is in its partially closed position, as illustrated in FIG. 5. In this position the sleeve does not overlie the sealing means 50 and a much lower internal pressure is sufficient to raise the sealing means 50 off the passage 48. As will be seen, location of the sleeve 22 in the partially closed position would be advantageous in an application like that illustrated in FIG. 1.

When the sleeve 22 is to be moved to its open position to expose the passageway 18 of the vacuum breaker 10 in an application such as that illustrated in FIG. 3, the clip can be placed in the deep groove 58 to prevent its loss.

A resilient annular, circumferentially split auxiliary clip 60 similar to the clip 54 is mounted within one of a pair of relatively shallow and deep auxiliary grooves 62 and 64, respectively, location of the clip 60 in the shallow groove 62, as illustrated in FIG. 5, enabling the clip 60 to act as a stop to limit movement of the sleeve 22 beyond its open position. If it is desired to move the sleeve 22 beyond its open position and completely off the body 12, the auxiliary clip 60 can be either removed or placed within the deeper groove 64, as seen in FIG. 14, to enable the sleeve 22 to pass over it. As was true of the clip 54, the clip 60 can also take the form of a resilient seal such as an O-ring, if desired.

Figure 2:
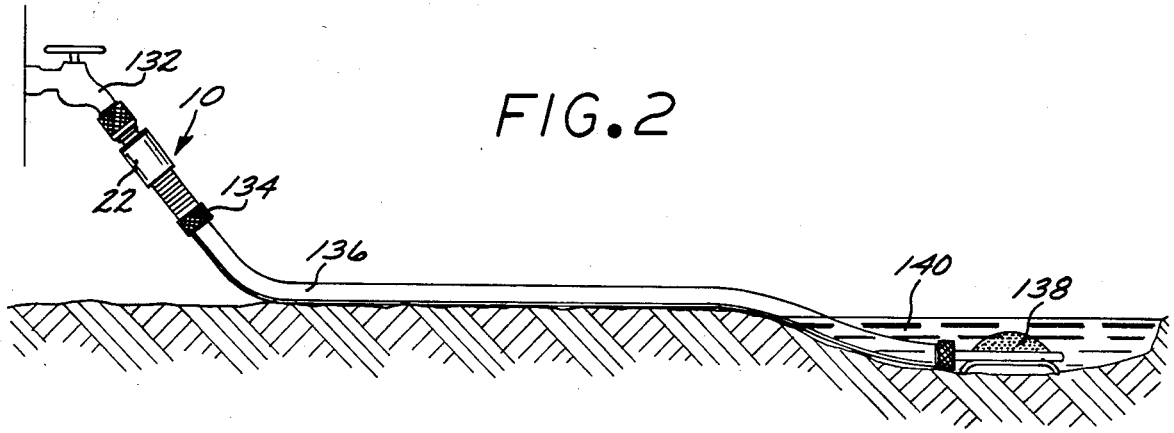
FIG. 2 is a schematic view of the present vacuum breaker installed in a garden hose connected to a typical lawn sprinkler.

Clips 54 and 60 are primarily to ensure against accidental movement of the sleeve 22 while the internal chamber is pressurized, as typified by FIGS. 1 or 2. When used as a vacuum breaker, as shown in FIGS. 3 or 4, atmospheric pressure exists in the body 12 and thus there is no tendency for the sleeve 22 to move. Further, the downstream seal 52 is usually in contact with sleeve 22. Also, as will be seen, in the embodiment of FIG. 3 a nailing clamp 70 is operative to tightly hold the vacuum breaker 10 against a wall, which will prevent inadvertent movement of the sleeve 22. The same is true of the embodiment of FIG. 4, except that a thin wall conduit clamp 73 is used to hold the vacuum breaker 10 against the wall.

Figure 9:
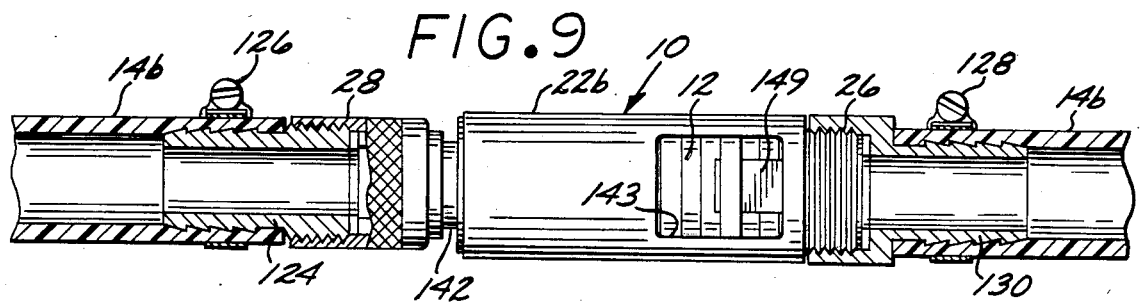
FIG. 9 is a view of the present vacuum breaker having end fittings specially adapted for connection to one type of tubing discharge line.

In certain applications, such as that illustrated in FIGS. 1, 5 and 9, as will be seen, it is advantageous when the sleeve 22 is in its closed position to be able to see the liquid flowing through the interior 20 of the body 12, in which case the sleeve 22 is made of a transparent material, such as a plastic material. Also, if the sleeve and body are made of plastic material the sleeve can be bonded to the body in any preferred longitudinal and rotational position. Bonding can be so complete so as to withstand internal pressures and thereby eliminate one or more resilient seals 52, if desired.

Figure 10:
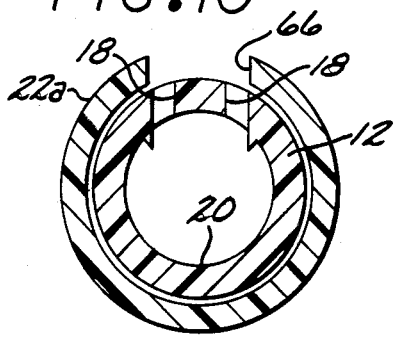
FIG. 10 is a view similar to FIG. 7, but illustrating an embodiment of the sleeve which is rotatably movable rather than longitudinally movable to cover and uncover the lateral passageway in the vacuum breaker body.

Although the sleeve 22 has been described as being longitudinally movable between its fully closed and open positions, it is possible to configure the sleeve as shown at 22a in FIG. 10 to include a longitudinally extending vent opening 66. Rotation of the sleeve 22a upon the body 12 to the position illustrated in FIG. 10 defines an open position in which there is direct or maximum communication between the interior 20 of the body 12 and the atmosphere. However, there is an annular space between the body 12 and the sleeve 22a in all rotated positions of the sleeve 22a. This enables venting with a minimum of water splashing out of the vent opening 66. If desired, the sleeve 22a could be marketed with the sleeve 22a glued to the body 12 in any selected position of rotation suitable to the end use contemplated.

Another form of sleeve 22b is illustrated in FIG. 9. It is approximately twice the length of sleeve 22 or sleeve 22a. The downstream extremity in FIG. 9 includes a rectangular slot 143 similar to the slot 66 of sleeve 22a in FIG. 10. In addition, when this long sleeve 22b is used, the clips 54 and 60 would either be removed or placed in the deeper, storage clip grooves 58 and 64. The sleeve 22b is prevented from sliding off by the union fitting 32, as seen in FIG. 5, or by a tubing adapter 130, as will be described later in conjunction with the embodiment of FIG. 9.

In the position shown in FIG. 9, the sleeve 22b can serve in a backflow prevention mode, as in the applications of FIGS. 1 and 2. Alternatively, the sleeve 22b can be reversed in position so that the opening 143 can be rotated into and out of alignment with the passageways 18, in which case the sleeve 22b can serve as a vacuum breaker in applications such as that illustrated in FIGS. 3 and 4.

The exterior surface of the body 12 adjacent the flange 44 is cylindrical and defines a groove 142 adapted to accept the arcuate extremity 68 of a usual and conventional nailing clamp 70 adapted to be driven into a stud or other structure of a wall 72, as best seen in FIG. 17. In addition, a groove 141 of the body 12 is adapted to receive a usual and conventional thin wall conduit clamp 73 for attachment to the wall 72, if that form of attachment is more convenient. Finally, the body has suitable wrench flats 149 disposed about the circumference to enable tightening and removal of screwed couplings or pipe fittings to either end of the body 12.

In certain applications, particularly when the sleeve 22 is in its fully closed position and the vacuum breaker 10 is performing a backflow prevention function, one or more backflow preventers are located within the body 20. More particularly, as best seen in FIG. 13, an upstream backflow preventer 74 is disposed within the upstream extremity of the body 12 and includes a central nozzle portion 76 and a flange 78. The flange 78 is disposed between and retained by the adjacent ends of the discharge line 14 and the body 12, and preferably is made of resilient material whereby the flange 78 can be used in substitution for the resilient seal 40 of the embodiment illustrated in FIG. 5. The nozzle portion 76 of the preventer 74 diminishes in cross-section in a downstream direction, its downstream extremity being closed to prevent upstream or backflow of liquid through the nozzle portion 76. However, a flow of liquid under pressure in a downstream direction may occur by reason of the distention of the resilient material of the preventer 74 and consequent opening of the downstream extremity.

For various reasons it may be necessary or desirable on occasion to control the rate of liquid flow through the body 12, and to shape the stream of liquid flowing past the passageway 18. In this regard, as best seen in FIG. 16, a flow restrictor disk or wafer 80 is located in the upstream chamber 46 adjacent an annular seat 82 formed as an integral, inwardly projecting part of the inner wall of the upstream chamber 46. The seat 82 defines an inlet to the body interior 20.

The disk 80 includes a central nozzle or orifice 84 which is operative to develop a pressure differential across the disk 80 and increase the velocity of liquid flow past the passageway 18. In addition, the smaller diameter orifice 84, compared to the larger diameter of the interior 20, tends to form the liquid in a stream in spaced relation to the interior surfaces of the body 12 which define the passageway 18. This tends to prevent or reduce splashing, spatter or escape of liquid out of the passageway 18. The nozzle or orifice 84 is located upstream and out of obstructing relation to the passageway 18, as is apparent from the drawings, and particularly FIG. 16.

An alternative form of flow control device is illustrated in FIG. 15. It takes the form of a flow control nozzle 86 located in the upstream chamber 46, upstream of the passageway 18, and diminishing in size or cross-section in a downstream direction to increase the velocity of liquid flow past the passageway 18. Like the disk 80, the nozzle 86 is also operative to form or shape the liquid in a stream in spaced relation to the interior surface of the body 12 which defines the passageway 18. However, the nozzle is not concentric within the bore 20, but rather is designed to shift the main body of the emitted stream farther away from openings 18.

A characteristic of the disk 80 and the nozzle 86 is the shaping of the liquid stream in spaced relation from the passageway 18 at reduced flow rates, and particularly on shut-off of the associated softener 16 or other appliance. In contrast, in certain other devices water dripping and splattering sometimes occurs during the initiation or termination of a cycle.

Careful configuration and placement of flow control orifices, passageways 18 and openings 66 or 143, contribute to minimize spatter and leakage out of the sleeve opening during operation in the vacuum breaker mode shown in FIGS. 3 and 4. Almost all splash or spatter out through an opening, such as the openings 18 of FIG. 10, is eliminated by the sleeve 22a. The sleeve 22a becomes a splash guard or deflection and re-direction shield. The sleeve is rotatable to the best position to suit a particular job and thereby eliminates a direct path for water droplets traveling from bore 20 to the outside.

Figure 11:
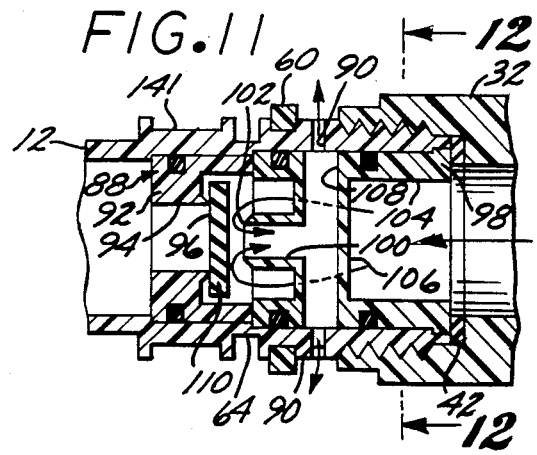
FIG. 11 is a longitudinal cross-sectional view of the downstream chamber of the body, particularly illustrating the backflow preventer in its backflow mode.

In addition to or in place of the upstream backflow preventer 74, a downstream backflow preventer 88 may be utilized in conjunction with a pair of radially or laterally extending discharge passages 90. The passages 90 open to atmosphere from the interior of the body 12 adjacent the inner terminus of the male threads 26, as best seen in FIGS. 5 and 11. The preventer is shown in its normal flow mode of operation in FIG. 5, and its backflow mode of operation in FIG. 11.

The backflow preventer 88 comprises a generally cylindrical upstream check 92 having an upstream orifice or nozzle 94 and an upstream nozzle seat extending in a downstream direction.

The preventer 88 also includes a cylindrical downstream check 98 having a centrally located orifice or downstream nozzle 100 and a downstream nozzle seat 102 in confronting, spaced apart relation to the upstream nozzle seat 96.

Both the upstream and downstream checks 92 and 98 mount suitable O-ring or like seals to provide a fluid tight fit within the body 12.

The interior of the downstream check 98 is characterized by a central bore 104 within which the nozzle 100 is centrally located. A lateral conduit extends across the bore 104 and defines a backflow passage 108 in communication at its opposite ends with the discharge passages 90 in the body 12. The backflow passage 108 is also in communication with the nozzle 100.

A disk having opposite flat faces constitutes a valve 110 located in the space between the nozzle seats 96 and 102. The valve 110 is movable against the downstream nozzle seat 102 by liquid flowing in a downstream direction, thereby directing said liquid from said upstream nozzle 94, around the circumference of the valve 110, and externally of the nozzle 100 and the conduit 106 and through the bore 104 to the drain 24. The described direction of liquid flow is illustrated by the arrows in FIG. 5. Upon backflow of liquid, that is, in an upstream direction, the valve 110 is movable against the upstream nozzle seat 96, thereby directing the back flowing liquid from the bore 104, around the conduit 106, and into the nozzle 100 and backflow passages 108 for discharge out of the passages 90 for escape to atmosphere, as indicated by the arrows in FIG. 11.

FIGS. 14 and 18, respectively, show the open and the fully closed positions of sleeve 22. The drawings also illustrate how the vacuum breaker 10 can be coupled to drain lines made of flexible or rigid tubing 14a or the like. An annular resilient hose washer or upstream seal 112 is arranged to seat against the end of the upstream extremity of the body 12, and a cylindrical, externally threaded tube adaptor 114 is threaded to the female threads 30 of the union fitting 28. The adapter 114 is urged by the union fitting 28 against the seal 112 to retain the extremity of the tubing 14a disposed within the central bore of the adapter 114.

In similar fashion an annular, resilient downstream seal 116 is seated against the downstream extremity of the body 12 and a cylindrical tube adapter ferrule 118 is seated within the downstream extremity. It includes a downstream end engaged by the seal 116.

An internally threaded union fitting 120 is threaded onto the male threads 26 and includes a flange 122 adapted to compress the downstream seal 116 on tightening. This retains the extremity of the tubing 14a disposed within a counterbore portion of the central bore of the ferrule 118. The bore of the upstream extremity of the ferrule 118 tapers radially inwardly from a diameter approximating that of the adjacent interior portion of the body 12, to a diameter approximating that of the tubing 14a, thereby reducing or eliminating turbulent flow.

FIG. 9 illustrates yet another coupling means, in this instance a coupling means particularly adapted for coupling the vacuum breaker 10 between the adjacent extremities of flexible tubing 14b constituting the drain line. The upstream extremity of the body 12 is attached to an externally threaded cylindrical tubing adapter 124 by the union fitting 28. The unthreaded exterior portion of the adapter 124 is characterized by bayonet type ridges for retaining such portion within the interior of the tubing section 14b.

A usual hose clamp 126 is employed to prevent separation of these components. A similar hose clamp 128 is employed to secure connection of the other section of tubing 14b to a similar tubing adapter 130, except that the adapter 130 is characterized by female threads for threadably mounting the adapter 130 to the male threads 26 of the body 12. The end couplings or end fittings described are merely exemplary, and various other coupling arrangements will suggest themselves to those skilled in the art.

Yet another end connection, not illustrated, may be used with plastic pipe drain lines. A connecting plastic sleeve, smeared or coated internally with adhesive, can be slipped at its opposite ends over the extremity of the body 12 and the adjacent plastic drain line.

In operation, the vacuum breaker 10 is most typically used in the application illustrated in FIG. 4, in which the sleeve 22a is located in its fully closed position and wherein passageway 66 does not directly overlie passageway 18, as is typified in FIG. 10. Preferably a flow control device such as 80 or 86 of FIGS. 16 and 15, respectively, are employed in such an application, but normally the backflow preventers 74 and 88 are removed in order to provide minimal impedance to liquid flow. In some instances the sleeve 22a can be in the open position and in some cases remove entirely, if desired.

In one embodiment the vacuum breaker 10 is quickly and easily convertible to other uses in which liquid flowing through the breaker 10 is under considerable pressure. Thus, for example, sleeve 22b is movable to one of its closed positions, and the vacuum breaker 10 then becomes a backflow prevention device. In one typical application, the vacuum breaker 10 with the sleeve 22 in its fully closed position is threaded onto the usual household water faucet or hose bib 132, as seen in FIG. 2. Its opposite or downstream end is threaded into the usual union fitting 134 of a garden hose 136 which is connected to a lawn sprinkler 138. Should the sprinkler 138 become submerged in a pool of polluted or contaminated water 140, the breaker 10 acting in its backflow prevention mode prevents such water 140 from reversely flowing into the household water system in the event that there is an unexpected pressure drop in the system. In such an application, not only is the sleeve 22 maintained in its fully closed position by the clip 54, as illustrated in FIG. 18, but also the backflow preventer 88 is installed. The upstream backflow preventer 74 may also be installed if this is found to be desirable for added protection. Ferrule 118 would need to be removed at any time it were desired to install backflow preventer 88.

FIG. 1 illustrates yet another application for use of the vacuum breaker 10 in a backflow prevention mode, utilizing the components just described in connection with the application of FIG. 2. In this instance the union fitting 134 of the garden hose 136 is connected to the hose bib 132 and the male end of the hose 136 is threadably connected to the upstream extremity of the body 12 by the union fitting 28. The opposite or downstream extremity of the body 12 is threaded into a union fitting 142 forming a part of a backflushing apparatus for flushing out the engine cooling system of a vehicle, as more particularly set forth in my co-pending patent application, Ser. No. 523,371, filed Aug. 15, 1983 and entitled "Backflush Coupling and Method for Internal Combustion Engine Cooling System", now U.S. Pat. No. 4,553,587. In that system water under pressure is directed through an engine block 144, radiator 146, heater 148, and system fitting 150 and through a garden hose 152 to drain.

As more particularly described in the application, the fitting 150 is normally attached to the union fitting 142 during normal vehicle operation, being separated therefrom during a backflushing operation. It is thus a simple matter to attach the breaker 10 to the existing union fitting 142 to thereby provide a source of liquid under pressure, and also to provide protection against liquid backflowing in an upstream direction into the household water system. In such an application the use of a transparent sleeve 22 permits the user to observe the rate of liquid flow and the degree of freedom of the liquid from rust particles and the like. In addition, the presence of the sealing means 50 is particularly useful in that it can be designed to vent pressure in excess of that which might harm the cooling system, such as approximately 20 pounds per square inch.

In dimensioning the vacuum breaker 10, the largest outside diameter is preferably adjacent the downstream extremity so that the lower portion of the breaker 10 will project outwardly of the upper portion when the breaker 10 is mounted to a wall, as shown in FIGS. 3 and 4. With this arrangement, water flowing at low flow rates tends not to flow out of the passageways 18.

Thus, there has been described a vacuum breaker 10 which can be used in situations requiring protection against back siphoning and, with components quickly and easily installed or rearranged, also can be used in applications in which liquid under pressure must be prevented from backflowing and/or where liquid over a certain pressure is to be detected visually or vented to atmosphere.

Various modifications and changes may be made with regard to the foregoing detailed description without departing from the spirit of the invention.

I claim:

1. A vacuum breaker for connection in a discharge line from a source of liquid, said vacuum breaker comprising:

a cylindrical body defining an elongated interior chamber having an inlet at its upstream extremity and an outlet at its downstream extremity, said body including coupling means for connection of said body in said discharge line for receipt of liquid at said inlet and discharge of liquid at said outlet, said body further including a longitudinally extending, laterally directed passageway opening from said chamber to atmosphere, said passageway opening through less than half the circumference of said cylindrical body whereby, upon inclining said body at an angle with respect to vertical, and with said passageway directed upwardly, the portion of said body opposite said passageway forms a trough for gravity retention and direction of liquid, particularly at very low rates of flow of such liquid, said body further including a nozzle adjacent said inlet for shaping liquid flowing at higher rates of flow into a stream flowing past said passageway in spaced relation to the axially directed walls of said chamber, said nozzle terminating upstream of said passageway out of obstructing relation to said passageway whereby maximum venting of said chamber may be achieved; and a cylindrical sleeve coaxial with said body and movable between a shield position overlying said passageway to prevent liquid from spattering out of said passageway, and an open position providing maximum venting of said chamber to atmosphere.

2. A vacuum breaker according to claim 1 wherein said sleeve is longitudinally movable and said open and shield positions are longitudinally spaced apart; and wherein said body includes integral outwardly projecting stop means engageable with said sleeve to prevent movement of said sleeve beyond said shield position; and wherein said body includes adjacent shallow and deep locking clip grooves adjacent the downstream extremity of said sleeve; and including a resilient annular, circumferentially split safety clip within said shallow clip groove for outward projection and engagement with said downstream extremity of said sleeve to prevent movement of said sleeve from said shield position to said open position; said safety clip further being adapted to fit within said deep clip groove out of engagement with said extremity of said sleeve to permit movement of said sleeve from said shield position to said open position.

3. A vacuum breaker according to claim 2 wherein the downstream extremity of said body includes adjacent shallow and deep auxiliary grooves; and including a resilient, annular, circumferentially split auxiliary clip adapted to fit within said shallow auxiliary groove for outward projection and engagement with said downstream extremity of said sleeve to prevent movement of said sleeve beyond said open position, said auxiliary clip fitting within said deep auxiliary groove out of engagement with said extremity of said sleeve to permit movement of said sleeve beyond said open position.

4. A vacuum breaker according to claim 1 wherein the movement of said sleeve between said open and shield positions is longitudinal along said body.

5. A vacuum breaker according to claim 1 wherein said sleeve includes a vent opening, and said sleeve is rotatable upon said body to align said vent opening and said passageway to define said open position, said sleeve being further rotatable to move said vent opening out of alignment with said passageway and out of said open position.

6. A vacuum breaker according to claim 5 wherein portions of said sleeve are radially spaced from said body to vent said chamber through said passageway in all rotated positions of said sleeve.

7. A vacuum breaker according to claim 1 wherein said nozzle comprises a flow control wafer having a central orifice and seated in said body upstream of said passageway and operative to increase the velocity of liquid flow past said passageway.

8. A vacuum breaker according to claim 1 wherein said nozzle is seated in said body upstream of said passageway, said nozzle diminishing in size in a downstream direction to increase the velocity of liquid flow past said passageway.

9. A vacuum breaker according to claim 1 wherein said nozzle is defined by a radially inwardly tapering interior portion of said body to form a low turbulence stream directed toward said outlet.

10. A vacuum breaker for connection in a discharge line from a source of liquid, said vacuum breaker comprising:

an elongated cylindrical body defining an elongated interior chamber having an inlet at its upstream extremity and an outlet at its downstream extremity, said body including coupling means for connection of said body in said discharge line for receipt of liquid at said inlet and discharge of liquid at said outlet, said body further including a longitudinally extending, laterally directed passageway opening from said chamber to atmosphere, said passageway opening through less than half the circumference of said cylindrical body whereby, upon inclining said body at an angle with respect to vertical, and with said passageway directed upwardly, the portion of said body opposite said passageway forms a trough for gravity retention and direction of liquid, particularly at very low rates of flow of such liquid, said body further including a nozzle adjacent said inlet for shaping liquid flowing at higher rates of flow into a stream flowing past said passageway in spaced relation to the axially directed walls of said chamber; and a cylindrical sleeve coaxial with said body and movable between a shield position overlying said passageway to prevent liquid from spattering out of said passageway, and an open position providing maximum venting of said chamber to atmosphere, said sleeve including a vent passage, portions of said sleeve being radially spaced from said body to vent said body through said passageway in any circumferential position of said sleeve relative to said body.

11. A vacuum breaker according to claim 10 wherein said body includes an externally located circumferential channel adapted to receive a clamp for attachment of the vacuum breaker to a wall or the like.

12. A vacuum breaker according to claim 10 wherein said body includes longitudinally spaced apart wrench flats.

13. A vacuum breaker according to claim 10 and including seal means between said sleeve and said body for frictional constraint against movement of said sleeve out of an adjusted position, and for preventing water leakage between said body and the downstream extremity of said sleeve.

* * * * *